United States Patent
Kidokoro et al.

[11] Patent Number: 6,036,617
[45] Date of Patent: Mar. 14, 2000

[54] CONTINUOUSLY VARIABLE TRANSMISSION, AND CONTROLLER AND CONTROL METHOD THEREOF

[75] Inventors: Hitoshi Kidokoro; Itsuro Muramoto; Masahiro Tsukamoto, all of Yokohama, Japan

[73] Assignee: Nissan Motor Co., Ltd., Yokohama, Japan

[21] Appl. No.: 09/190,441

[22] Filed: Nov. 13, 1998

[30] Foreign Application Priority Data

Nov. 13, 1997 [JP] Japan ................................. 9-312048

[51] Int. Cl.⁷ .......................... F16H 61/02; F16H 15/38; B60K 41/12
[52] U.S. Cl. .................. 476/3; 476/10; 477/37; 477/48; 477/50
[58] Field of Search ............ 476/3, 10; 477/37, 477/48, 50; 474/11, 22

[56] References Cited

U.S. PATENT DOCUMENTS

| | | | |
|---|---|---|---|
| 4,434,675 | 3/1984 | Kraus | 74/200 |
| 4,945,483 | 7/1990 | Tokoro | 364/424.1 |
| 5,062,050 | 10/1991 | Petzold et al. | 364/424.1 |
| 5,136,890 | 8/1992 | Hibi et al. | 74/190.5 |
| 5,189,611 | 2/1993 | Petzold et al. | 364/424.1 |
| 5,643,132 | 7/1997 | Inoue | 476/10 |
| 5,669,845 | 9/1997 | Muramoto et al. | 477/50 X |
| 5,674,145 | 10/1997 | Kidokoro et al. | 475/192 |

FOREIGN PATENT DOCUMENTS

| | | |
|---|---|---|
| 0 281 947 | 9/1988 | European Pat. Off. . |
| 0 424 005 | 4/1991 | European Pat. Off. . |
| 8-326887 | 12/1996 | Japan . |

Primary Examiner—Allan D. Herrmann
Attorney, Agent, or Firm—Foley & Lardner

[57] ABSTRACT

A speed ratio of a continuously variable transmission is varied according to an oil pressure which is adjusted by a valve driven by a step motor. The step motor is feedback controlled so that a real speed ratio coincides with a target speed ratio determined according to the running conditions of a vehicle. By determining a feedback gain based on the oil pressure, oil temperature, real speed ratio and output shaft rotation speed of the transmission, precise control of the speed ratio according to the running state is realized.

7 Claims, 13 Drawing Sheets

CONTINUOUSLY VARIABLE TRANSMISSION, AND CONTROLLER AND CONTROL METHOD THEREOF

FIELD OF THE INVENTION

This invention relates to control of a continuously variable transmission for a vehicle.

BACKGROUND OF THE INVENTION

A toroidal continuously variable transmission for a vehicle disclosed in U.S. Pat. No. 4,434,675 and U.S. Pat. No. 5,136,890 varies a speed ratio in proportion to the hydraulic pressure supplied by a control valve.

The speed ratio is fed back to the control valve through a mechanical feedback device.

In addition, U.S. Pat. No. 5,674,145, U.S. Pat. No. 5,669,845 and Tokkai Hei 8-326887 published by the Japanese Patent Office in 1996 disclose an electronic feedback controller wherein a target speed ratio is set according to the running state of the vehicle, and the control valve is controlled so that a real speed ratio of the continuously variable transmission is equal to this target speed ratio.

The operating characteristics of the continuously variable transmission and the mechanical feedback device change according to various conditions such as an output shaft rotation speed.

gyration angle of the power roller which transmits a torque inside the continuously variable transmission, a line pressure supplied to the control valve and the temperature of hydraulic fluid which is a medium for transmitting hydraulic pressure.

Therefore, it is desirable to set the gain of the feedback control carefully according to these conditions in order to achieve a stable speed ratio control.

SUMMARY OF THE INVENTION

It is therefore an object of this invention to accurately set the feedback gain in electronic feedback control of a continuously variable transmission.

In order to achieve the above objects, this invention provides a controller for controlling a speed ratio of a continuously variable transmission for use with a vehicle. The transmission has an input shaft, output shaft, a valve for providing pressurized oil to change a speed ratio of rotations of the input shaft and output shaft, and an actuator for operating the valve.

The controller comprises a sensor for detecting a rotation speed of the input shaft, a sensor for detecting a rotation speed of the output shaft, and a sensor for detecting a pressure of the pressurized oil, a sensor for detecting a temperature of the pressurized oil, and a microprocessor.

The microprocessor is programmed to calculate a target speed ratio of the continuously variable transmission according to a running state of the vehicle, calculate a real speed ratio of the continuously variable transmission based on the rotation speed of the input shaft and the rotation speed of the output shaft, determine a feedback gain based on the temperature, the pressure, the real speed ratio and the rotation speed of the output shaft, feedback control the actuator under the predetermined feedback gain such that the real speed ratio coincides with the target speed ratio based on a deviation between the real speed ratio and the target speed ratio.

This invention also provides a continuously variable transmission for use with a vehicle. The transmission comprises an input shaft, output shaft, a valve for providing pressurized oil, an actuator for operating the valve, a mechanism which varies a speed ratio of the rotations of the input shaft and the output shaft according to a pressure of the pressurized oil, a sensor for detecting a rotation speed of the input shaft, a sensor for detecting a rotation speed of the output shaft, a sensor for detecting the pressure of the pressurized oil, a sensor for detecting a temperature of the pressurized oil, and a microprocessor.

The microprocessor is programmed to calculate a target speed ratio of the rotations of the input shaft and the output shaft according to a running state of the vehicle, calculate a real speed ratio of the rotations of the input shaft and the output shaft based on the rotation speed of the input shaft and the rotation speed of the output shaft, determine a feedback grain based on the temperature, the pressure, the real speed ratio and the rotation speed of the output shaft, and feedback control the actuator under the predetermined feedback gain such that the real speed ratio coincides with the target speed ratio based on a deviation between the real speed ratio and the target speed ratio.

This invention also provides a control method for controlling a speed ratio of a continuously variable transmission for use with a vehicle. The transmission comprises an input shaft, output shaft, a valve for providing pressurized oil, an actuator for operating the valve, and a mechanism which varies a speed ratio of the rotations of the input shaft and the output shaft according to a pressure of the pressurized oil.

The method comprises the steps of calculating a target speed ratio of the rotations of the input shaft and the output shaft according to a running state of the vehicle, detecting a real speed ratio of the input shaft and the output shaft, calculating a feedback gain based on a temperature of the pressurized oil, the pressure, the real speed ratio and the rotation speed of the output shaft, and feedback controlling the actuator under the predetermined feedback gain such that the real speed ratio coincides with the target speed ratio based on a deviation between the real speed ratio and the target speed ratio.

The details as well as other features and advantages of this invention are set forth in the remainder of the specification and are shown in the accompanying drawings.

DESCRIPTION OF THE PREFERRED EMBODIMENTS

Figure 1:
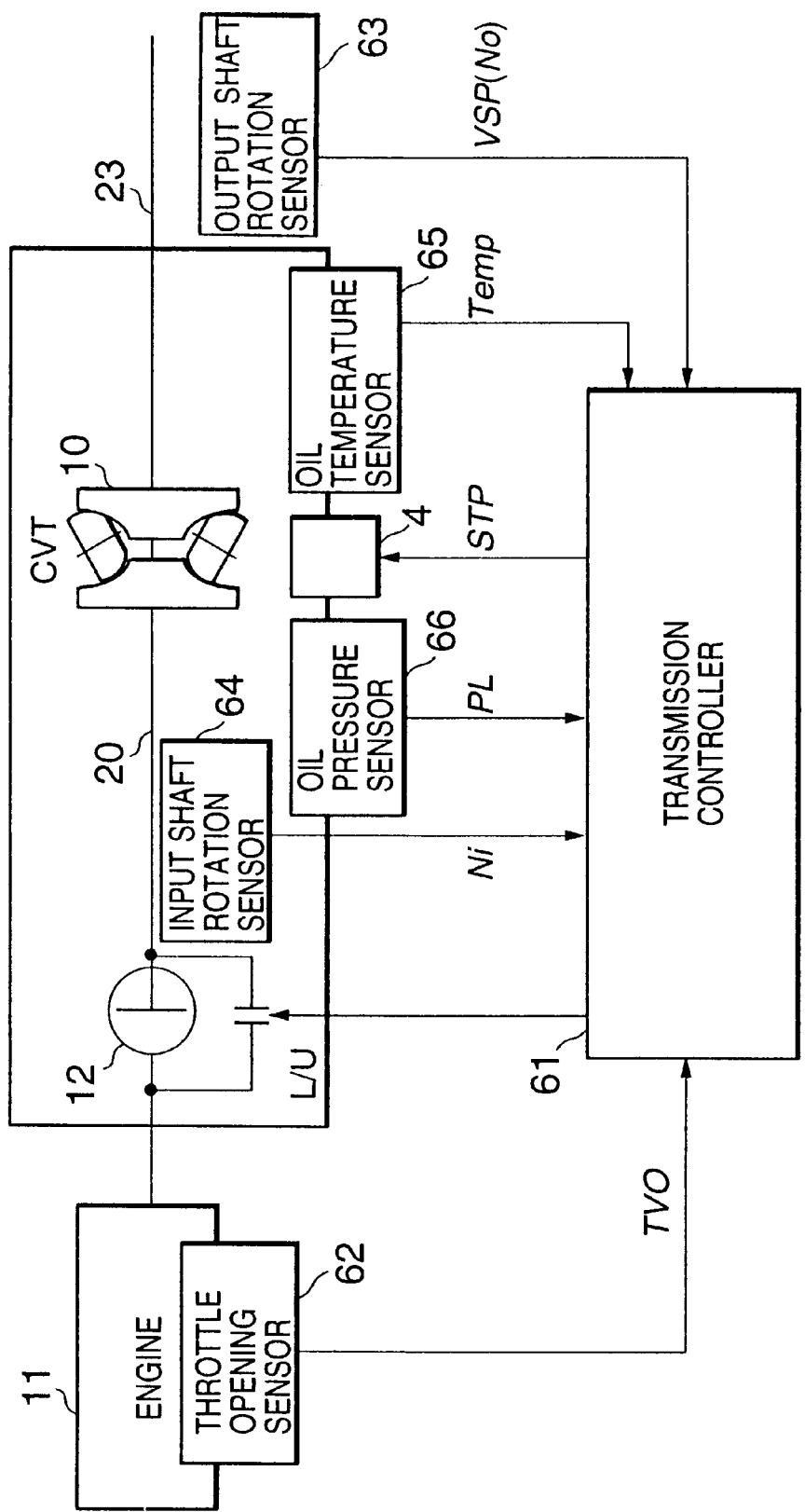
FIG. 1 is a schematic diagram of a speed change control device according to this invention.

Referring to FIG. 1 of the drawings, a toroidal continuously variable transmission 10 of single cavity type of a vehicle connects an input shaft 20 to an engine 11 via a torque converter 12.

The torque converter 12 comprises a lockup mechanism.

An output shaft 23 of the continuously variable transmission 10 is connected to the drive wheels, not shown.

Figure 10:
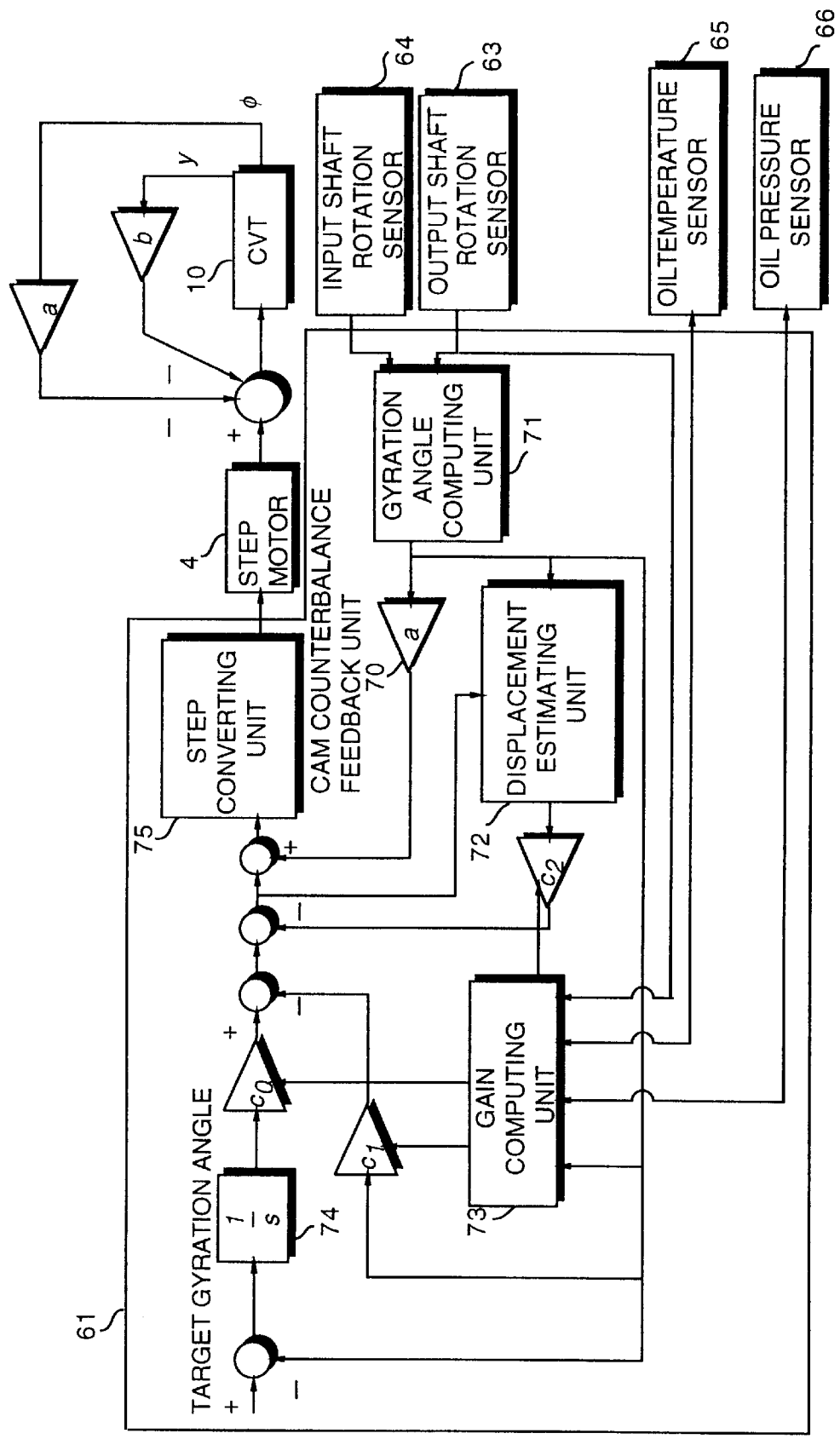
FIG. 10 is similar to FIG. 2, but showing a fourth embodiment of this invention.
Figure 11:
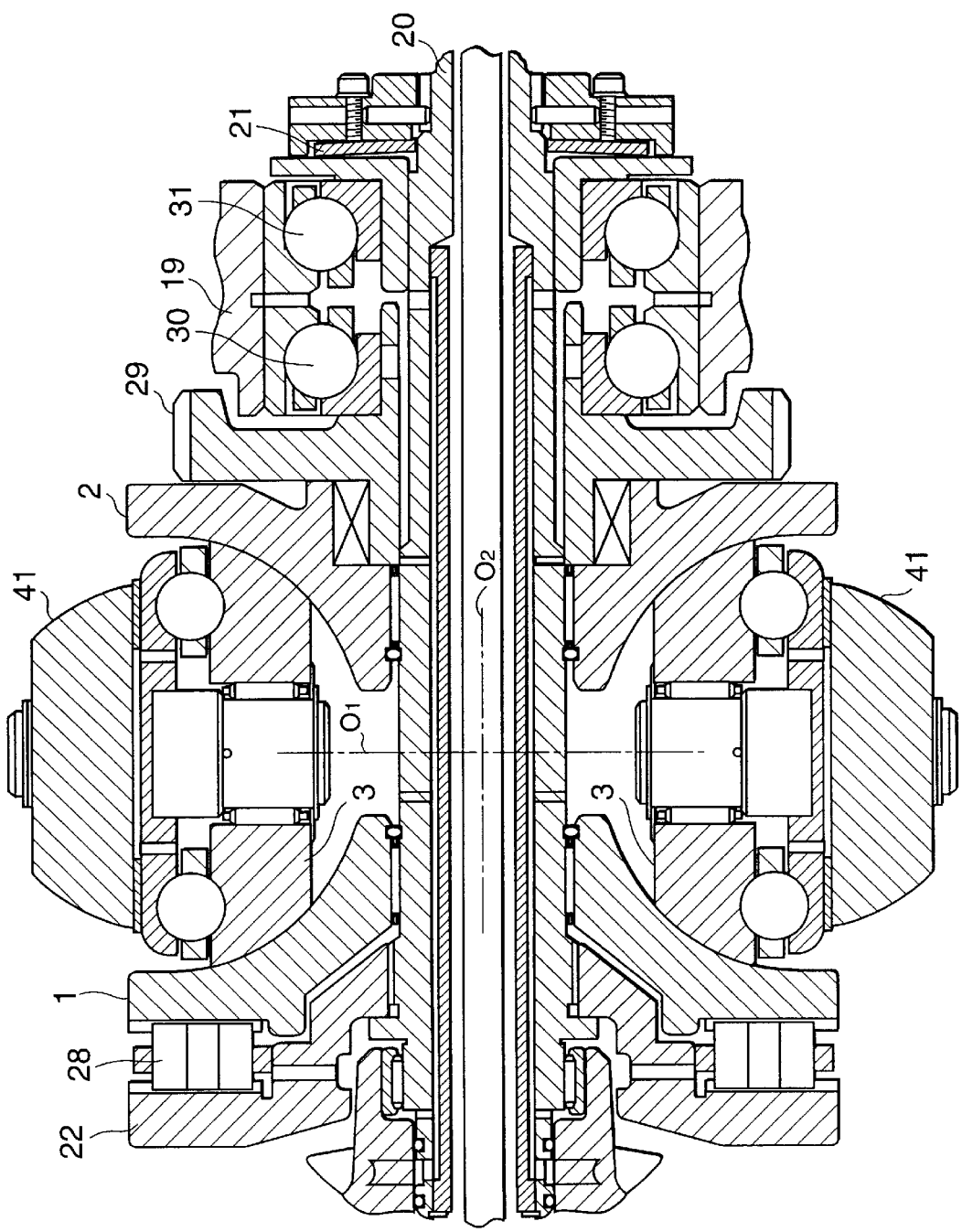
FIG. 11 is a longitudinal sectional view of the toroidal continuously variable transmission.

The continuously variable transmission 10 comprises an input disk 1 and output disk 2 arranged on the same axis, and a pair of power rollers 3 which are gripped between the disks 1, 2 and transmit torque between the disks by friction as shown in FIGS. 10 and 11.

The rotation of the input disk 1 is transmitted to the power rollers 3 by the shear force on an oil film, and the rotation of the power rollers 3 is transmitted to the output disk 2 by the shear force on the oil film.

Power transmission from the output disk 2 to the input disk 1 is performed in a similar manner.

The shear force of the above-mentioned oil film is generated by a speed difference generated between the input and output disks 1, 2, and by the pressure acting on the oil film, i.e. the pressure which the input/output disks 1, 2 exert on the power rollers 3.

In order to exert this pressure, a loading cam 28 having a rotation axis perpendicular to the input shaft 20 is arranged between a cam disk 22 formed on an input shaft and the back face of the input disk 1, as shown in FIG. 11.

The input disk 1 is supported free to rotate relative to the input shaft 20.

When a rotation phase difference is generated by the cam disk 22 and input disk 1, the input disk 1 is pressed toward the right of the figure along the center axis $O_{20}$ of the input shaft 20 due to the rolling of the loading cam 28 between the back face of the input disk 1 and the cam disk 22.

Due to this pressing force, the output disk 2 which is supported free to rotate on the input shaft 20 together with an output gear 29 via a bearing 30 and an input disk 1 grips the power rollers 3, and a thrust force is generated according to the rotation torque of the input shaft 20.

The input shaft 20 is free to rotate in a casing 19 via a bearing 31. The output gear 29 is connected to the drive wheels via an output shaft 23 of FIG. 1.

When the input torque of the input shaft 20 is minute, the loading cam 28 does not operate, so the bearing 31 is always pushed toward the input disk 1 by a plate spring 31, and a predetermined pressing force (pre-load) is therefore constantly supplied.

Figure 12:
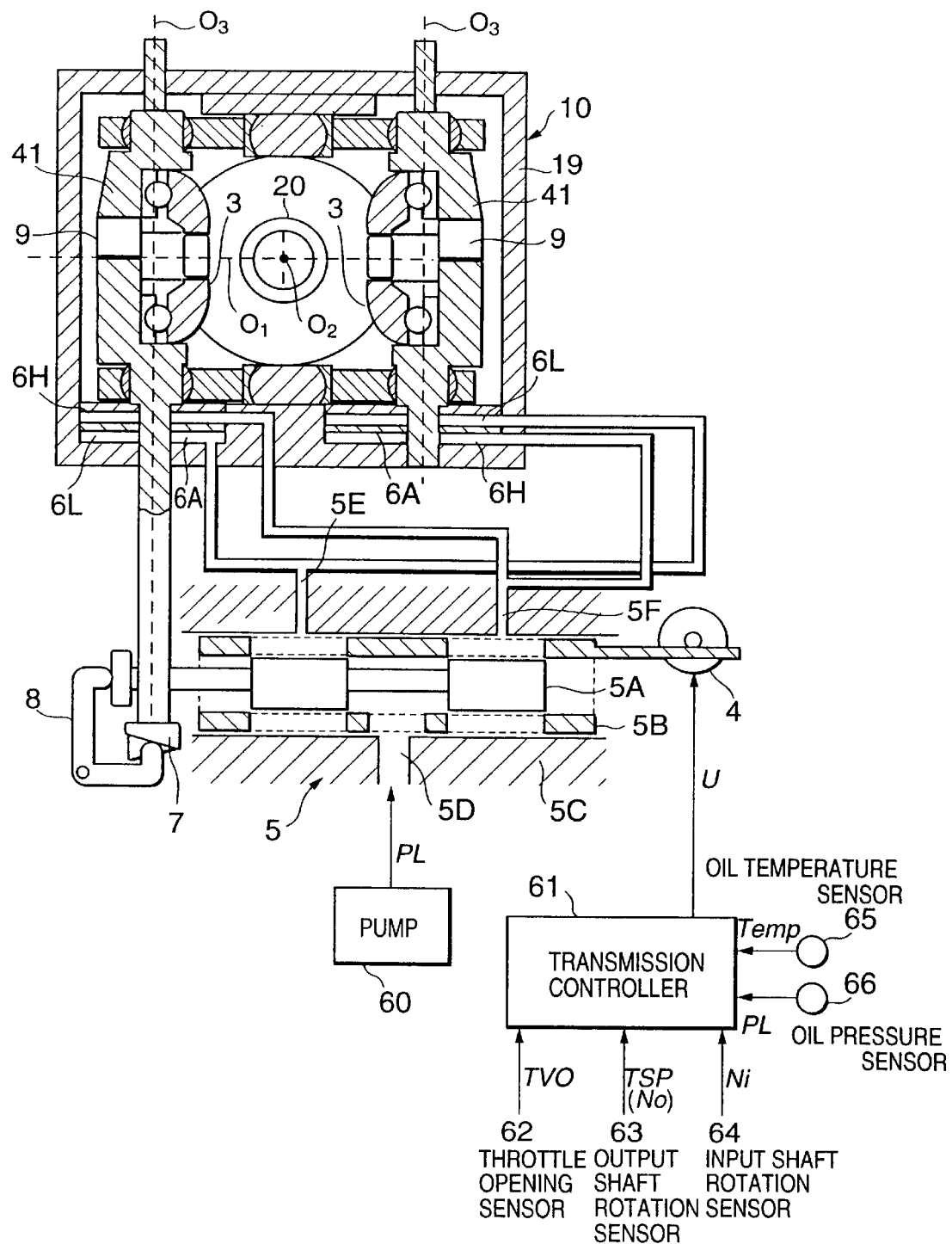
FIG. 12 is a cross sectional view of the toroidal continuously variable transmission.

Each of the power rollers 3 is supported free to rotate on an offset axis 9 attached to a trunnion 41 as shown by FIG. 12. The offset axis 9 is supported free to pivot relative to the trunnion 41, and the trunnion 41 is supported free to rotate about a trunnion axis $O_3$ as center.

The piston 6A is fixed to the base end of the trunnion 41.

The piston 6A drives the trunnion 41 along the trunnion axis $O_3$ in response to the oil pressure of upper and lower oil chambers 6H, 6L. Oil pressure is supplied to the oil chambers 6H and 6L from an oil pressure unit 60 via a control valve 5.

The control valve 5 comprises a sleeve 5B driven by a step motor 4 in response to a command signal from a transmission controller 61 and a spool 5A which engages with the inside of a sleeve 41.

The displacement of the trunnion 41 in the direction of the trunnion axis $O_3$ and its rotational displacement about the trunnion axis $O_3$ as center is fed back to the displacement of the spool 5B via a mechanical feedback mechanism which comprises a precess cam 7 and link 8.

The step motor 4 rotates according to a speed change command value (step number) output by the controller 61, and causes a relative displacement of the sleeve 5B and spool 5A via a rack and pinion.

The control valve 5 comprises an input port 5D connected to the oil pressure unit 60, and ports 5E and 5F. The port 5E is connected to the oil chamber 6L of the trunnion 41 on the left of FIG. 12 and the oil chamber 6H of the trunnion 41 on the right of FIG. 12. The port 5F is connected to the oil chamber 6H of the trunnion 41 on the left of the figure and the oil chamber 6L of the trunnion 41 on the right of the figure. These ports 5E and 5F are selectively connected with the port 5D according to the relative displacement of the sleeve 5B and spool 5A.

As a result, the pair of trunnions 41 is always driven in opposite directions. Due to the displacement in opposite directions of these trunnions, the power rollers 3 are offset in opposite directions along the axis $O_3$ from the neutral position shown in FIG. 11 at which the rotation axis $O_1$ intersects with the rotation axis $O_2$ of the disks 1 and 2.

Due to this offset in the $O_3$ axis direction, the power rollers 3 receive component forces from the input and output disks 1 and 2, and the trunnions 41 are rotated about the rotation axis $O_3$. As a result, the contact radius of the power roller 3 and the input disk 1 reaches a value different from the contact radius of the power roller 3 and input disk 2. Due to the inclination of this power roller 3, any desired speed ratio can be obtained.

Here, a relation between an offset amount y in the $O_3$ axis direction and a gyration angle $\phi$ of the power roller 3 is approximately given by the following expression (1).

$$\frac{d\phi}{dt} = f \cdot y \qquad (1)$$

$$f = \frac{\cos(\theta - \phi) \cdot \{1 + \eta - \cos(2 \cdot \theta - \phi)\} \cdot No}{(1 + \eta) \cdot R \cdot \sin\theta}$$

where, $\theta, \eta, R$ = constants determined according to the dimensions of the transmission, and No = rotation speed of output disk 2.

The offset amount y and the gyration angle $\phi$ in the $O_3$ axis direction of the power roller 3 when the speed change command value output by the transmission controller 61 is achieved, is fed back from the trunnion 41 to the spool 5A of the control valve 5 via the precess cam 7 and link 8. Therefore, the spool 5A returns to the neutral position relative to the sleeve 5B, and the ports 5E and 5F are cut off from the port 5D as shown in FIG. 12.

As a result, the trunnion 41 returns to the neutral position at which the axes $O_1$, $O_2$ intersect while the power roller 3 is maintained at the gyration angle corresponding to the above-mentioned speed change command value.

The above construction of a toroidal continuously variable transmission is known from the above-mentioned U.S. Pat. No. 5,674,145.

The transmission controller 61 comprises a microprocessor comprising a central processing unit (CPU), read-only memory (ROM) and random-access memory (RAM), and input/output interfaces.

Signals from a throttle opening sensor 62 which detects an opening TVO of a throttle of the engine 11, an output shaft rotation speed sensor 63 which detects a rotation speed No of the output shaft 23 of the continuously variable transmission 10, and an input shaft rotation sensor 64 which detects a rotation speed Ni of the input shaft 20 of the continuously variable transmission 10, are input to the transmission controller 61 as shown in FIG. 1.

The vehicle speed VSP is obtained by multiplying the output shaft rotation speed No by a final gear ratio.

In addition, signals from an oil pressure sensor 65 which detects a line pressure PL supplied to the port 5D and a temperature sensor 65 which detects an oil temperature Temp, are input to the transmission controller 61. Based on the vehicle speed VSP and throttle opening TVO which indicate the running state of the vehicle, the transmission controller computes the target speed ratio. It also calculates an integral gain $c_0$, proportional gain $c_1$ and differential gain $c_2$ of proportional/integral/differential control (PID control) of the speed ratio based on the oil temperature Temp and line pressure PL.

A speed change command value U is then computed such that the real speed ratio of the continuously variable transmission 10 corresponds to the target speed ratio, and this is output to the step motor 4. The speed change command value U corresponds to a step number STP of the step motor 4.

Figure 2:
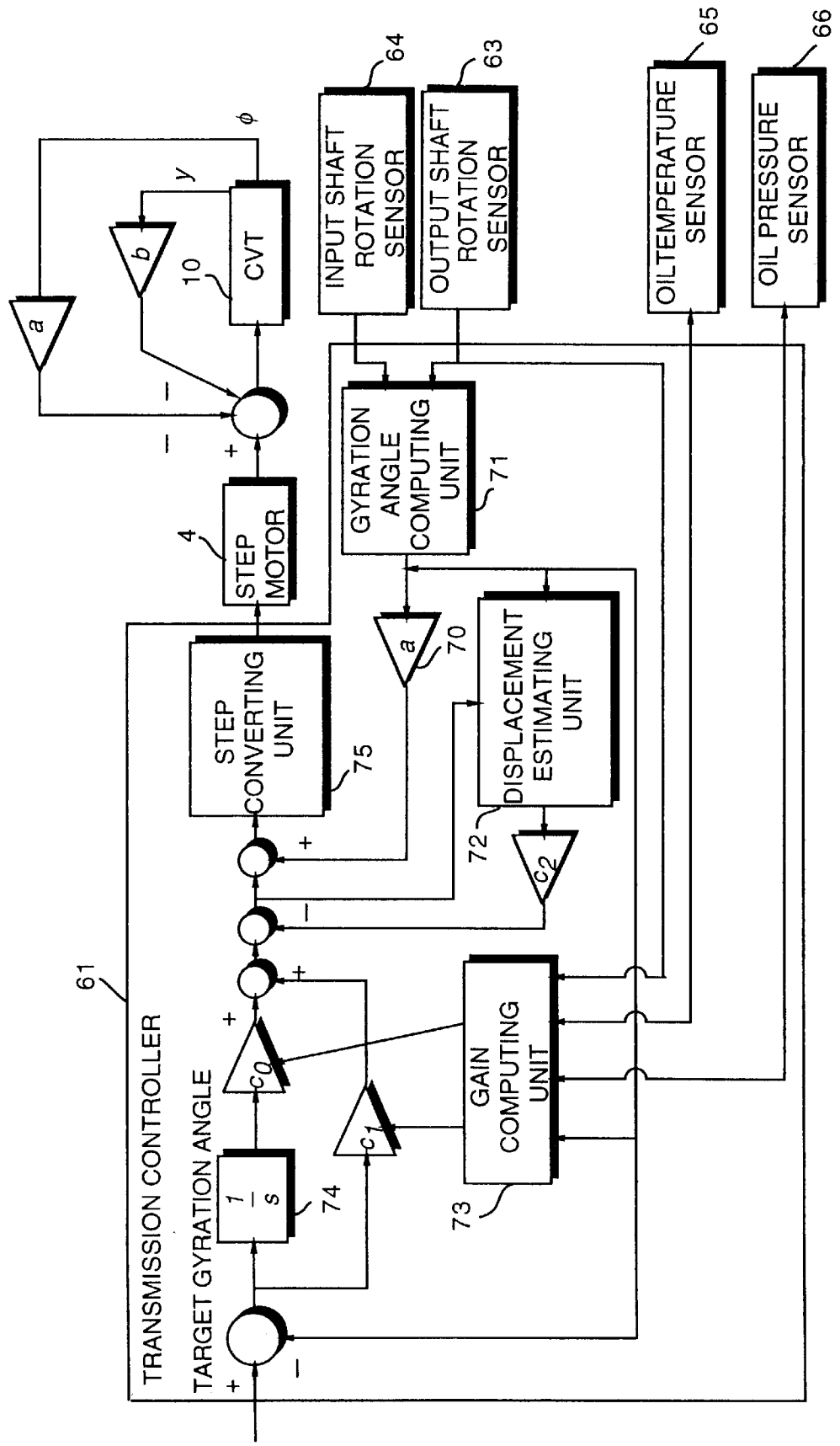
FIG. 2 is a block diagram which describes the functions of a transmission controller according to this invention.

Referring to FIG. 2, the controller 61 which performs the above control comprises a gyration angle computing unit 71 which calculates a real speed ratio, a target gyration angle computing unit, not shown, which computes the target speed ratio according to the throttle opening TVO and vehicle speed VSP, a y displacement estimating unit 72 which estimates the offset amount y of the power roller 3, a gain computing unit 73, an integrating unit 74, and a step converting unit 75.

These units are virtually implemented by the functions of the above-mentioned CPU, ROM, and RAM.

The gyration angle computing unit 71 computes the real speed ratio by multiplying the ratio of the vehicle speed VSP and the input shaft rotation speed Ni of the output disk 2 by a constant corresponding to the rotation ratio of the vehicle speed VSP and output disk 2. This real speed ratio corresponds to the real gyration angle $\phi$ of the power roller 3.

The target gyration angle computing unit computes the target gyration angle, that is the target speed ratio, based on a preset map from the throttle opening TVO and vehicle speed VSP. The y displacement estimating unit 72 estimates the offset amount y of the power roller 3.

This estimating method is known from U.S. Pat. No. 5,669,845.

This offset amount y may be found also by differentiating the gyration angle $\phi$ of the power roller 3.

The gain computing unit 73 calculates the gains $C_0$, $c_1$, and $c_2$ of PID control by the following expression (2).

$$c_0 = \frac{\lambda_1 \cdot \lambda_2 \cdot \lambda_3}{g \cdot f} \quad (2)$$

$$c_1 = \frac{(\lambda_1 \cdot \lambda_2 + \lambda_2 \cdot \lambda_3 + \lambda_3 \cdot \lambda_1)}{g \cdot f} \quad (3)$$

-continued $$c_2 = \frac{(\lambda_1 + \lambda_2 + \lambda_3)}{g} - b \quad (4)$$

where, b=feedback gain of offset amount y in the $O_3$ axis direction due to precess cam 7 and link 8.

Figure 3:
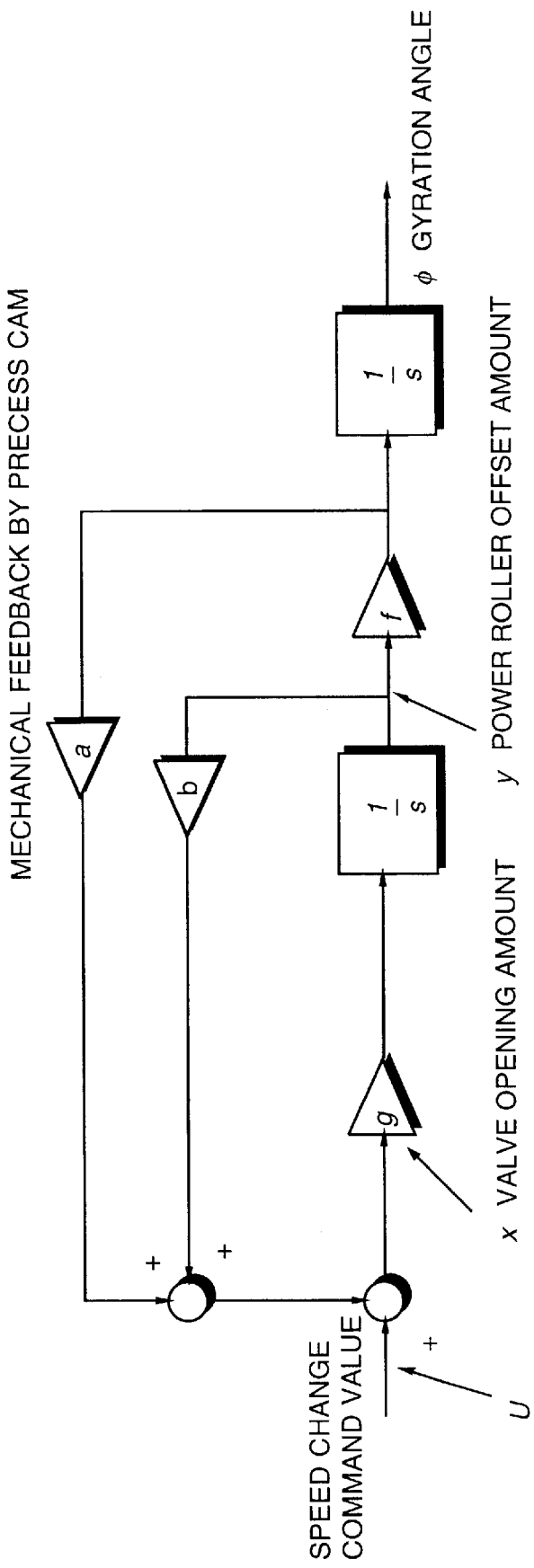
FIG. 3 is a block diagram which describes a control characteristic of a toroidal continuously variable transmission according to this invention.
Figure 4:
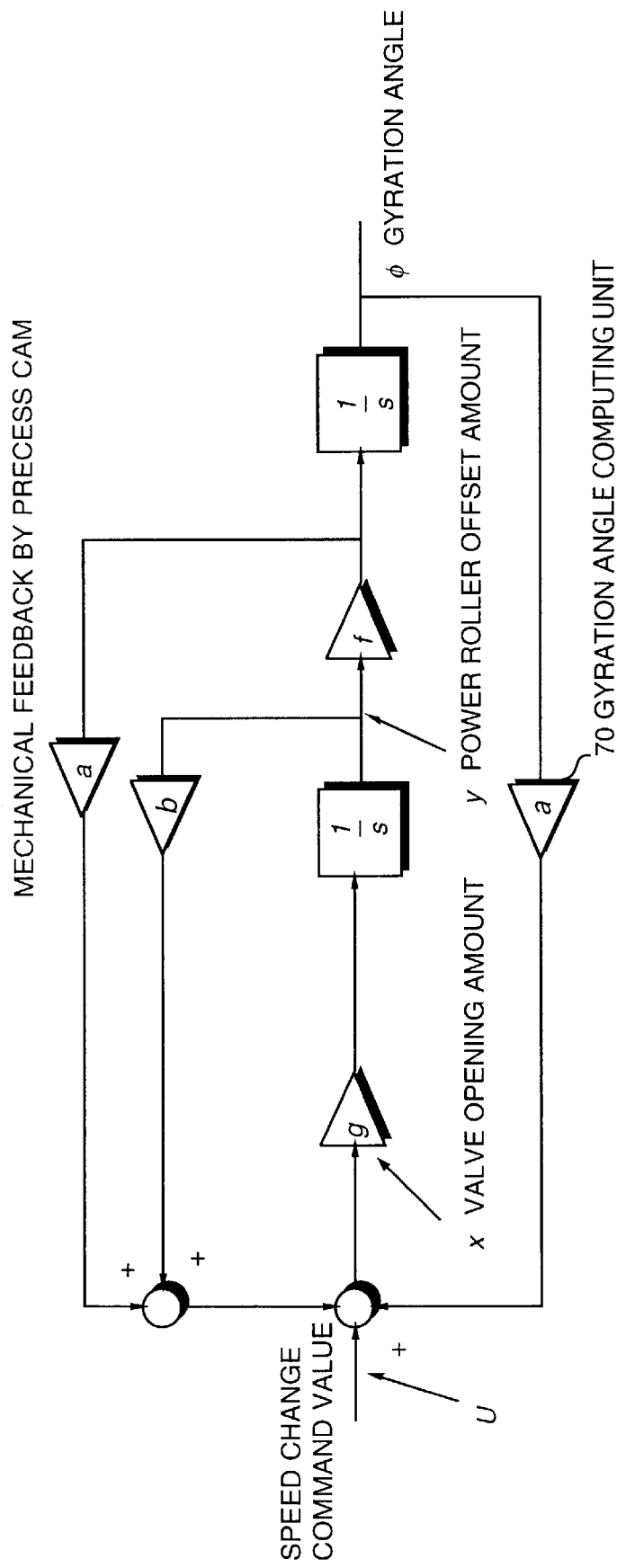
FIG. 4 is similar to FIG. 3, but describing a toroidal continuously variable transmission which comprises a cam counterbalance feedback unit.

The feedback control characteristic of the continuously variable transmission 10 is represented by the block diagram of FIG. 3. In this block diagram, a transfer function of the control system is given by the following expression (5).

$$G_P^{Org}(s) = \frac{g \cdot f}{s^2 + g \cdot b \cdot s + g \cdot f \cdot a} \quad (5)$$

where, a=feedback gain of gyration angle $\phi$ due to precess cam 7 and link 8.

The gains $c_0$, $c_1$, and $c_2$ are determined by equations (2)–(4) so that this linear system has the characteristic of the following expression (6).

$$W(s) = \frac{(c_1 \cdot s + c_0) \cdot g \cdot f}{(s + \lambda_1) \cdot (s + \lambda_2) \cdot (s + \lambda_3)} \quad (6)$$

where, the constants $\lambda_0$, $\lambda_1$ and $\lambda_2$ are coefficients representing the pole of the above-mentioned transfer function, and must be positive real numbers.

That is, the system becomes unstable and control to the target gyration angle is impossible if any of the constants $\lambda_0$, $\lambda_1$ and $\lambda_2$ is negative. Moreover, if any of the constants $\lambda_0$, $\lambda_1$ and $\lambda_2$ is imaginary, the feedback characteristic oscillates, and "hunting" occurs which has an adverse effect on drivability.

The gains $c_0$, $c_1$ and $c_2$, i.e. the computation process of Equations (2)–(4), when the transmission controller 61 has the construction shown in FIG. 2, will now be described.

First, when the transmission controller 61 has the construction shown in FIG. 2, by installing a cam counterbalance feedback unit 70 which adds the action of the precess cam 7 of the mechanical feedback mechanism to the command value U, the characteristic of the transfer function of expression (5) becomes equivalent to the next expression (7).

$$G_p(s) = \frac{g \cdot f}{s \cdot (s + g \cdot b)} \quad (7)$$

The cam counterbalance feedback unit 70 counterbalances the mechanical feedback amount by which the gyration angle $\phi$ is fed back.

Referring again to FIG. 2, the integrating unit 74 calculates an integral value of a deviation $\theta$ between the target gyration angle and real gyration angle $\phi$ computed by the gyration angle computing unit 71.

The speed change controller 61 multiplies this integral value by the gain $c_0$, and adds the gain $c_1$.

On the other hand, the value of the offset amount y calculated by the y displacement estimating unit 72 is multiplied by the gain $c_2$, and the value obtained is subtracted from the integral value.

The counterbalance value calculated by the counterbalance feedback unit 70 is added to this value, and is input to the step converting unit 75.

The transfer function of the process until the target gyrating angle is realized is given by the following expression (8). This expression is well known in control theory.

$$W(s) = \frac{(c_1 \cdot s + c_0) \cdot g \cdot f}{s^3 + (g \cdot b + g \cdot c_2) \cdot s^2 + g \cdot f \cdot c_1 \cdot s + g \cdot f \cdot c_0} \quad (8)$$

To make equation (8) coincide with equation (6), the gains $c_0$, $c_1$ and $c_2$ must be determined as shown by equations (2)–(4).

When the cam counterbalance feedback unit 70 is not used, the function of counterbalancing the mechanical feedback amount is assumed by the proportional gain $c_1$ by using the following equations (9)–(11) instead of the equations (2)–(4).

$$c_0 = \frac{\lambda_1 \cdot \lambda_2 \cdot \lambda_3}{g \cdot f} \quad (9)$$

$$c_1 = \frac{(\lambda_1 \cdot \lambda_2 + \lambda_2 \cdot \lambda_3 + \lambda_3 \cdot \lambda_1)}{g \cdot f} - a \quad (10)$$

$$c_2 = \frac{(\lambda_1 + \lambda_2 + \lambda_3)}{g} - b \quad (11)$$

In this calculation, it is assumed that the toroidal continuously variable transmission 10 is a linear system as shown in FIG. 3.

A real toroidal continuously variable transmission 10 is a nonlinear system as the constants g and f change due to various factors. However, a gain schedule method is well known wherein good control can be achieved even in a nonlinear system by making a linear approximation under certain conditions and changing over to that system according to variation of conditions.

Specifically, the constants g and f are calculated for these respective operating conditions, and the gains $c_0$, $c_1$, and $c_2$ are first calculated for each operating condition by the equations (2)–(4) or equations (9)–(11).

These gains $c_0$, $c_1$ and $c_2$ are then changed over according to the change in operating conditions.

The constant g used in equation (2) and thereafter is a gain of the process of change from the magnitude of a valve opening amount x of the control valve 5, that is, the gap between the sleeve 5B and spool 5A, to the offset amount y of the power rollers 3. Therefore, the constant g varies according to the operating conditions of the toroidal continuously variable transmission 10 and mechanical feedback mechanism.

The constant f used in the equation (2) and thereafter is obtained by substituting the constants θ, η and R determined from the structure of the totoidal continuously variable transmission 10, and the real gyration angle φ and output disk rotation speed No, in the equation (1).

The oil temperature Temp detected by the temperature sensor 65, line pressure PL detected by the oil pressure sensor 66, real speed ratio Ratio corresponding to the real gyration angle φ calculated by the gyration angle computing unit 71, and vehicle speed VSP detected by the vehicle speed sensor 63, are input to the gain computing unit 73 shown in FIG. 2.

The gain computing unit 73 determines the gains $c_0$, $c_1$ and $c_2$ by referring to a four-dimensional matrix preset for each gain by experiment based on these signals.

Assuming that the tables of gains are $c_0$_Table, $c_1$_Table and $c_2$_Table, the gains are calculated according to the operating state of the continuously variable transmission 10 by referring to three four-dimensional matrices, i.e.

$c_0 = c_0$_Table (VSP, Ratio, Temp, PL)

$c_1 = c_1$_Table (VSP, Ratio, Temp, PL)

$c_2 = c_2$_Table (VSP, Ratio, Temp, PL)

The controller 61, in the step converting unit 75, converts the input signal to a valve opening amount of the speed change control valve 5 necessary to cancel the deviation θ between the target gyration angle and real gyration angle. The step number STP corresponding to the amount of the valve opening obtained is output to the step motor 4.

Figure 5:
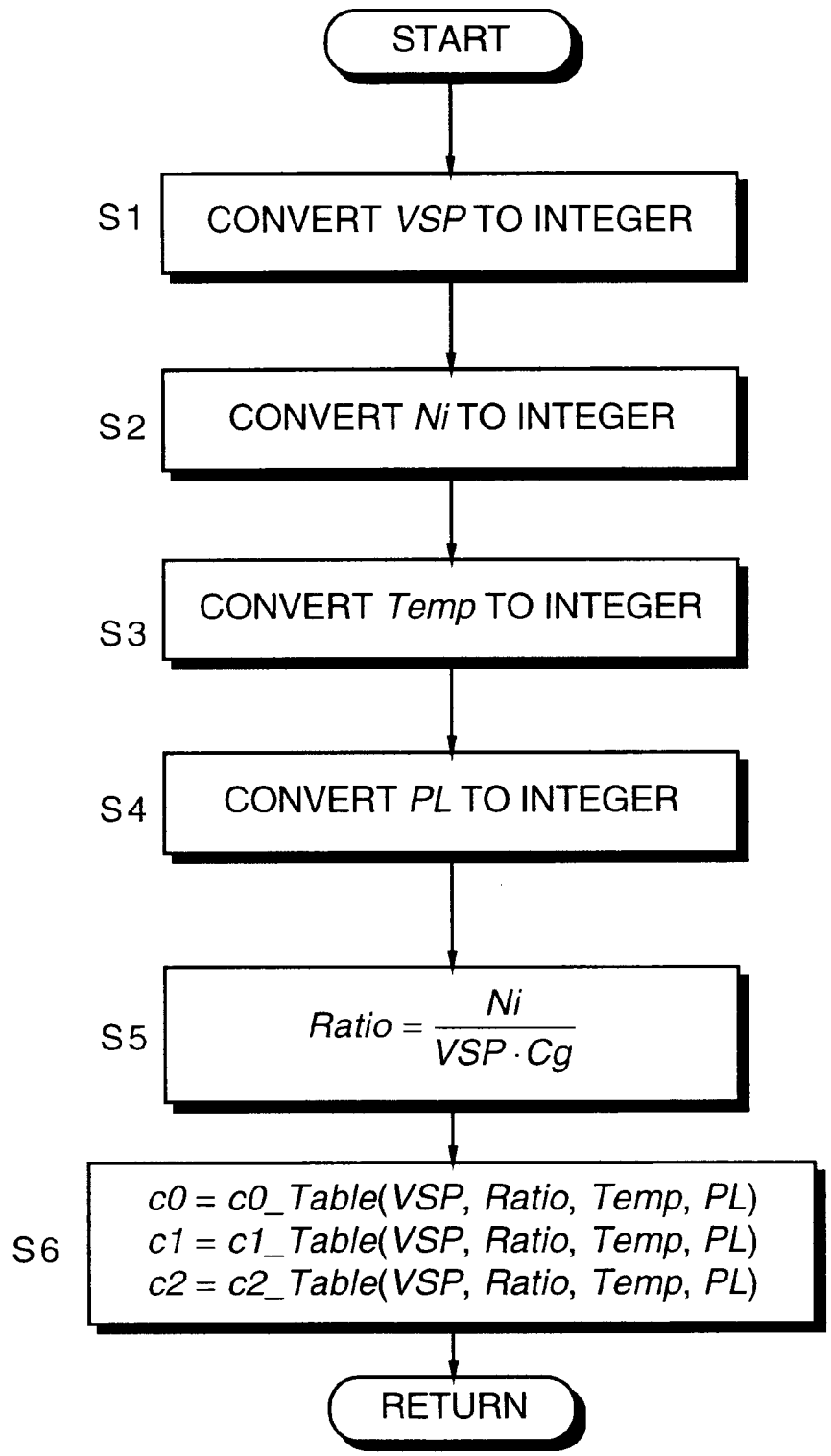
FIG. 5 is a flow chart which describes a gain computing process performed by the transmission controller.

Next, referring to the flowchart of FIG. 5, the gain computing process performed by the gain computing unit 73 of the transmission controller 61 will be described. This process is executed at an interval of, for example, ten milliseconds.

First, in a step S1, the vehicle speed VSP read from the vehicle speed sensor 63 is converted to an integer.

In a step S2, the rotation speed Ni of the input disk 1 read from the input shaft rotation sensor 64 is converted to an integer.

In a step S3, the oil temperature Temp read from the oil temperature sensor 65 is converted to an integer.

In a step S4, the line pressure PL read from the oil pressure sensor 66 is converted to an integer.

Herein, the integer conversion is performed as follows.

The minimum value of the vehicle speed VSP is for example set to 0, and the maximum value is set to 255.

The size of the matrix $c_0$_Table used to calculate the gain $c_0$ is set to 16 steps from 0 to 15.

In this case, $$VSP = \text{input value} \times \frac{16}{1 + 255 - 0}$$

is calculated and digits after the decimal point are discarded. In this way, the numerical value is adjusted so that the maximum value and minimum values of the input values become the maximum values and minimum values of the subscripts in the matrix.

In a step S5, the real speed ratio Ratio is obtained from the rotation speed Ni of the input disk and vehicle speed VSP by the next equation (12).

$$Ratio = \frac{Ni}{VSP \cdot Cg} \quad (12)$$

where, Cg=constant for converting the vehicle speed VSP to a rotation speed No of the output disk 2.

Based on the values thus obtained, the controller 61 calculates the three gains $c_0$, $c_1$ and $c_2$ from the four-dimensional matrices $c_0$_Table, $c_1$_Table and $c_2$_Table in a step S6.

Therefore, in this speed change controller, a feedback gain corresponding to the oil temperature Temp and line pressure PL in addition to the target speed ratio, real speed ratio or gyration angle is calculated.

For example, when the oil temperature Temp drops to a very low level on cold ground, the viscosity of the oil increases, the intake efficiency of the oil pump decreases, and the line pressure PL decreases.

In this device, as the feedback gain is determined in proportion to the oil temperature Temp and line pressure PL, the temperature variation or change in line pressure PL of the oil pressure unit 60 has No effect on speed change characteristics.

Therefore, precise feedback control can always be performed.

Moreover, the process which determines the target speed ratio or the target gyration angle is clearly separate from the process which determines the feedback gain. This facilitates development of the transmission controller.

Figure 6:
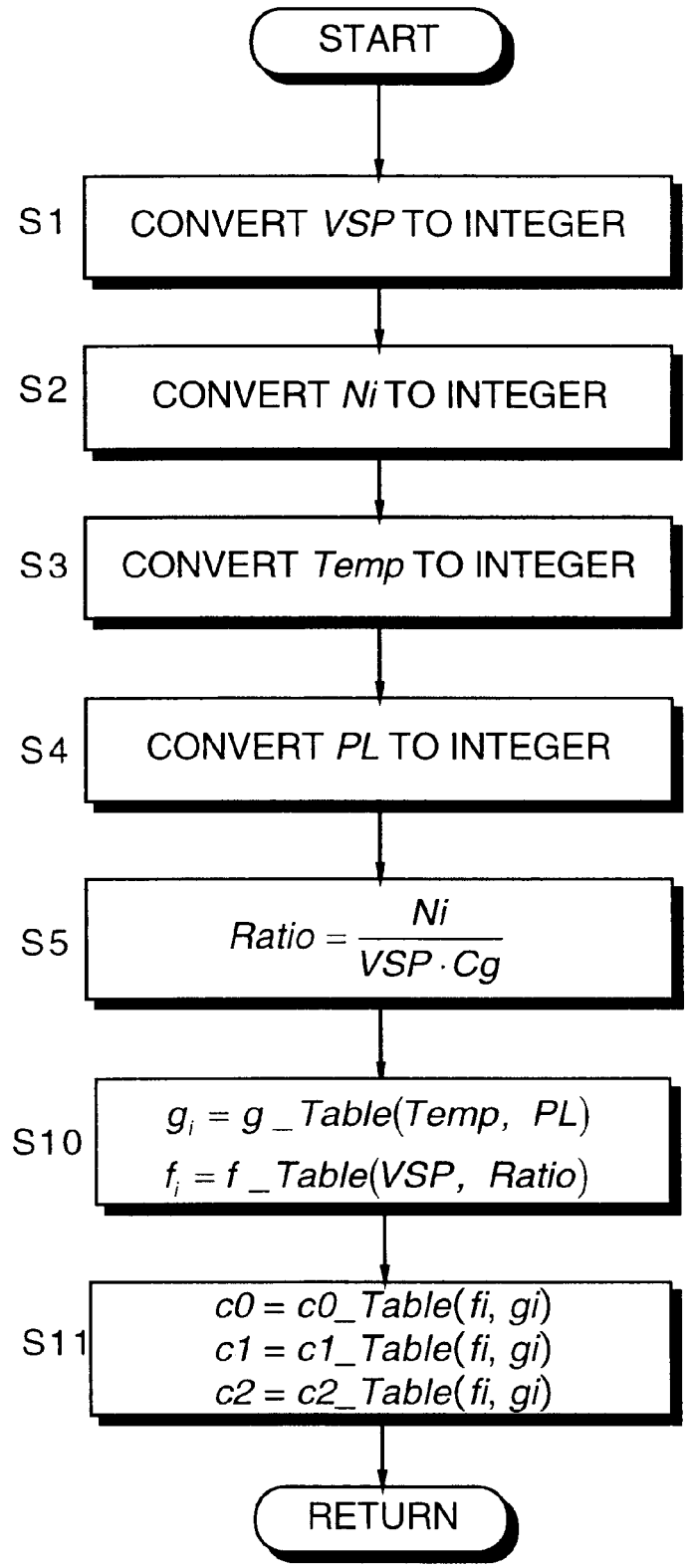
FIG. 6 is similar to FIG. 5, but showing a second embodiment of this invention.
Figure 7:
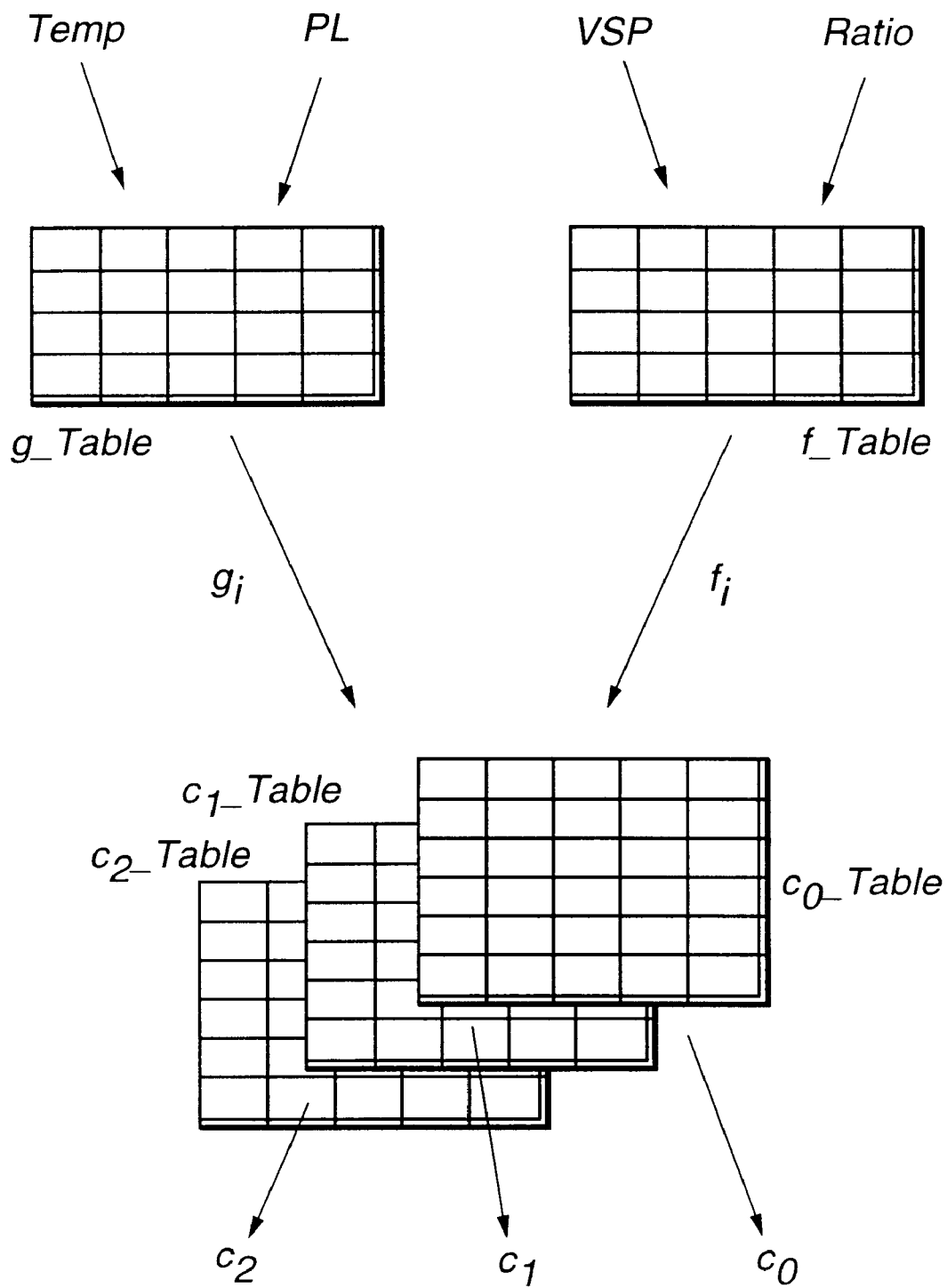
FIG. 7 is a diagram which describes a matrix table used in the second embodiment.

FIGS. 6 and 7 show a second embodiment of this invention.

Herein, of the processes performed by the gain computing unit 73 of the aforesaid first embodiment, the matrix computation of the step S6 is performed in two stages (steps S10 and S11).

The steps S1–S5 are identical to those of the aforesaid first embodiment.

The oil temperature Temp and line pressure PL are values related to g shown in FIG. 3 as in the first embodiment.

The gyration angle $\phi$ and vehicle speed VSP are values related to f in FIG. 3.

These constants are mutually independent.

For this purpose, a variable $g_i$ is first calculated from the oil temperature Temp and line pressure PL in the step S10 by referring to a preset two-dimensional matrix g_Table.

Similarly, a variable $f_i$ is calculated from the gyration angle $\phi$ and vehicle speed VSP by referring to a preset two-dimensional matrix f_Table.

The variable i is an integer which is a subscript in the gain matrices $c_0$_Table, $c_1$_Table, and $c_2$_Table, and it represents the positions of the matrix which determine the gains $c_0$, $c_1$ and $c_2$.

In a step S11, the gains $c_0$, $c_1$ and $c_2$ are obtained from the variables $g_i$ and $f_i$ by referring to the two-dimensional matrices $c_0$_Table($f_i,g_i$), $c_1$_Table($f_i,g_i$) and $c_2$_Table($f_i,g_i$) shown in FIG. 7.

Representing this process by a calculation equation, we have the following.

$c_0 = c_0$_Table($f_i,g_i$)

$c_1 = c_1$_Table($f_i,g_i$)

$c_2 = c_2$_Table($f_i,g_i$)

According to this embodiment, all matrices can be assumed to be two-dimensional, and there is No need to use a large matrix such as a four-dimensional matrix.

Therefore, by suppressing the capacity of the storage means such as the ROM, the manufacturing cost of the controller 61 can be reduced.

Further, by simplifying the computation process, the controller 61 can make use of a conventional eight bit microcomputer.

Moreover, as the value $g_i$ is calculated from the oil temperature Temp and line pressure PL, and the value $f_i$ is calculated from the gyration angle $\phi$ (or speed ratio) and vehicle speed VSP, the feedback gain determining process can be separated from processes related to oil and processes related to the vehicle running state.

This separation facilitates determining the matrix by experiment, and shortens development of the controller.

Figure 8A:
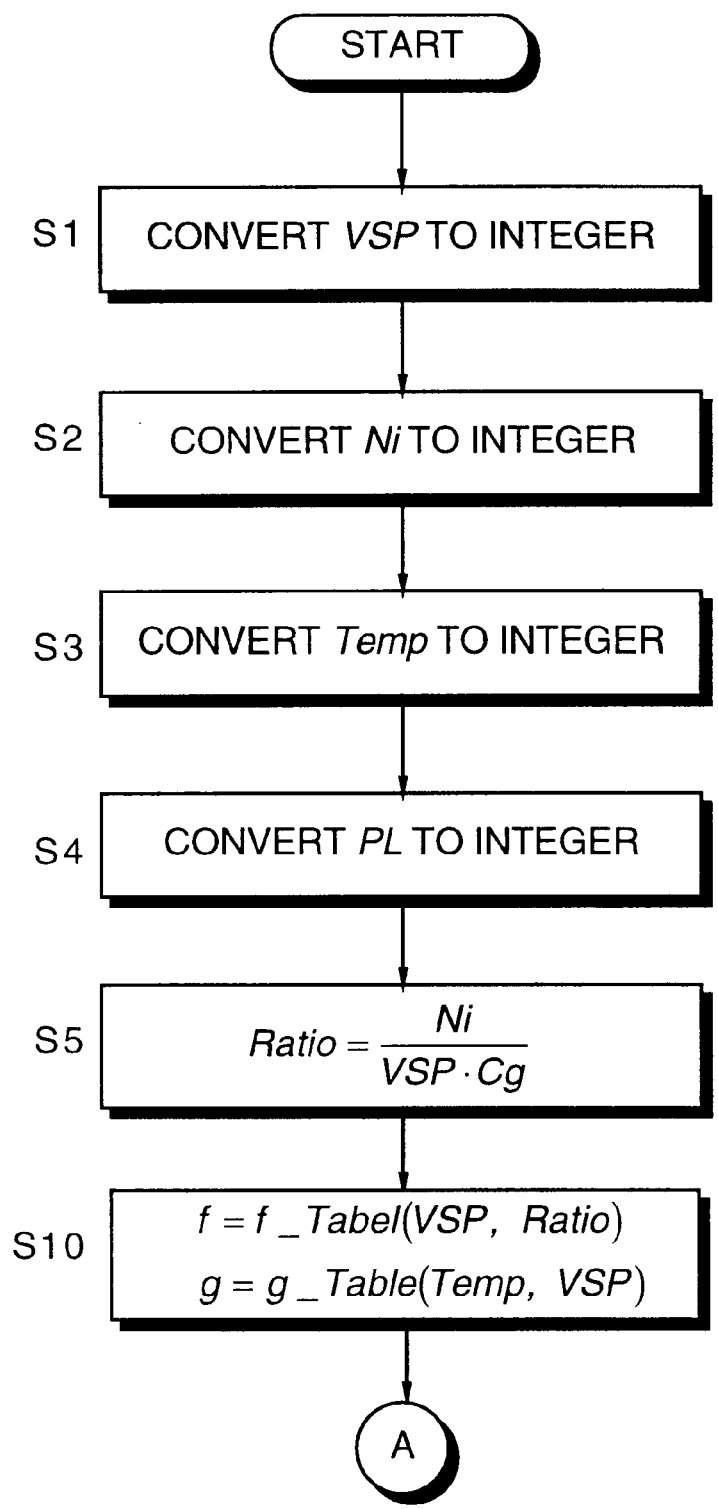
FIGS. 8A and 8B are similar to FIG. 5, but showing a third embodiment of this invention.
Figure 8B:
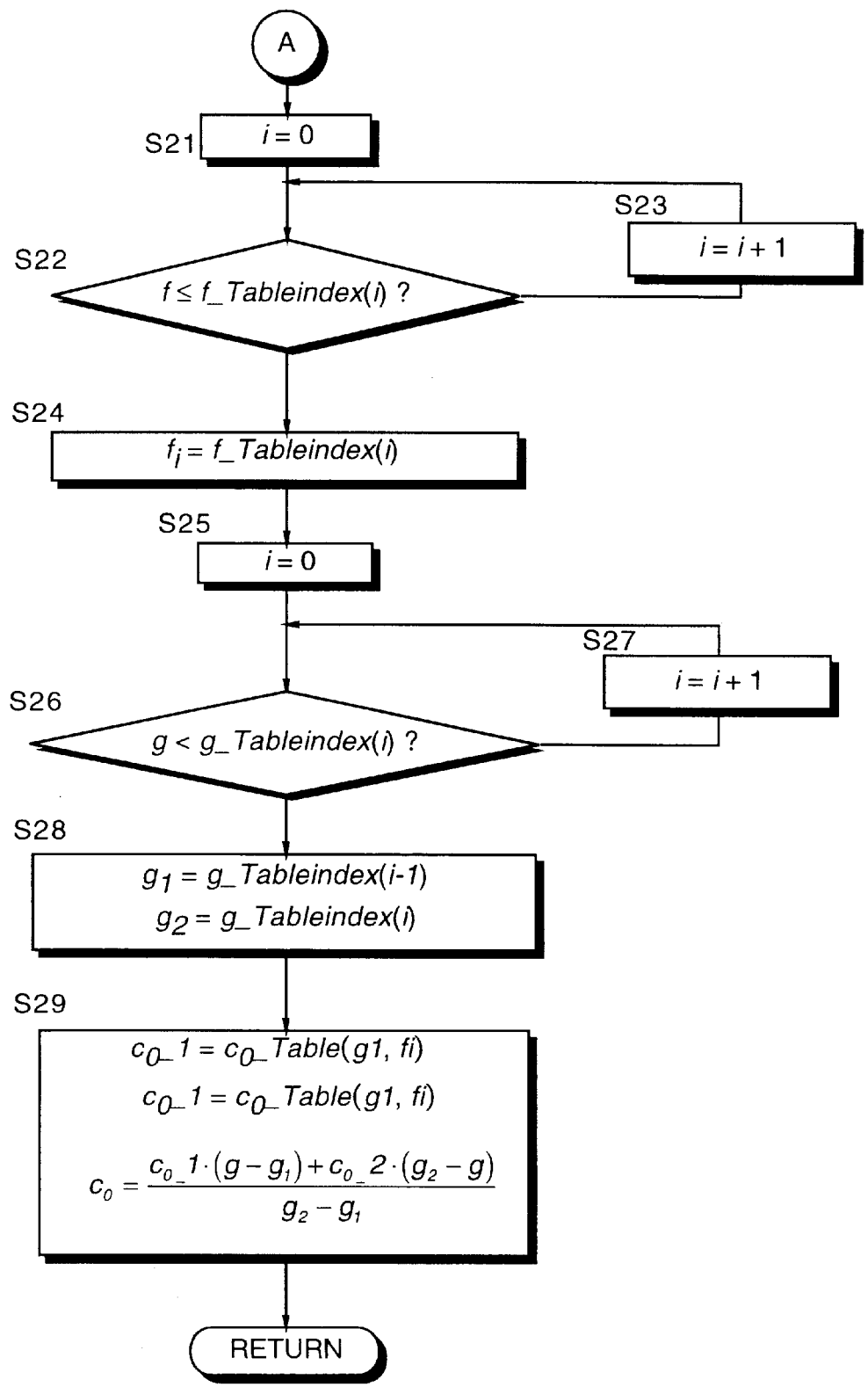

FIGS. 8A and 8B show a third embodiment of this invention.

Herein, of the processing performed by the gain computing unit 73 of the second embodiment, interpolation processing is added to the computation of the steps S10 and S11.

The steps S1–S5 are identical to the first and second embodiment.

In a step S20 following the step S5, a variable f is calculated from the real speed ratio Ratio and the vehicle speed VSP referring to a preset two-dimensional matrix f_Table.

Similarly, the value of a variable g is obtained from the oil temperature Temp and line pressure PL by a preset two-dimensional matrix g_Table.

The values of these variable f and g are not necessarily integers.

Next, the variable i is reset to 0 in a step S21.

In Steps S22 and S23, an (i)th value larger than the variable f and nearest to the variable f is calculated from a matrix f_Tableindex(i) which holds values in increasingly small order.

A value obtained in a step S24 is stored in the variable $f_i$ as $f_i$=f_Tableindex(i).

In a step S25, the variable i is reset to 0.

In steps S26 and S27, an (l)th value larger than the variable g and nearest to the variable g, and an (i−1)th value smaller than g, are calculated from a matrix g_Tableindex(l) which holds values in increasingly small order.

In a step S28, the obtained values are stored in the variables $g_1$=g_Tableindex(l−1) and $g_2$=g_Tableindex(l), where $g_1 < g_2$.

Figure 9:
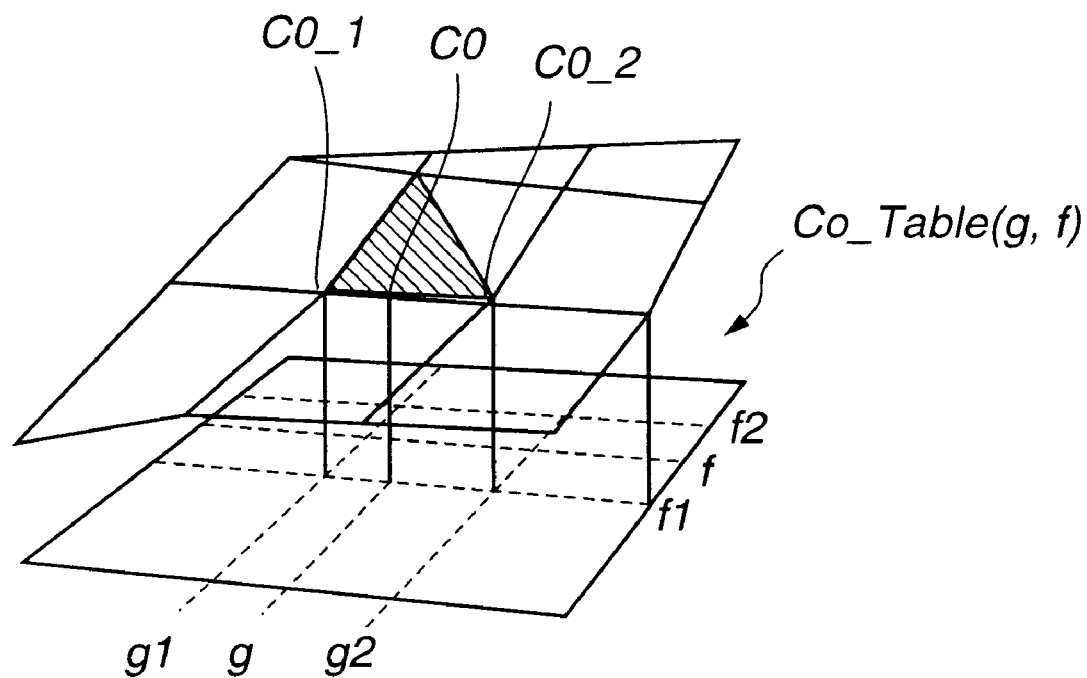
FIG. 9 is a diagram which describes a gain interpolation calculation in the third embodiment.

In a step S29, the gain $c_0$ is calculated from a two-dimensional matrix $c_0$_Table (g,f) shown in FIG. 9 as in the aforesaid second embodiment.

Representing this process by a calculation equation, we obtain the following.

$c_0\_1 = c_0$_Table($g_1,f_i$)

$c_0\_2 = c_0$_Table($g_2,f_i$)

In addition, the gain $c_0$ to which a linear interpolation is applied, is given by the following equation (13).

$$c_0 = \frac{c_0\_1 \cdot (g - g_1) + c_0\_2 \cdot (g_2 - g)}{g_2 - g_1} \qquad (13)$$

According to this embodiment, by using a two-dimensional matrix and performing an interpolation calculation, the feedback gains $c_0$, $c_1$ and $c_2$ can be obtained with high precision.

In the description of the processing from the steps S21 to S29, only the calculation of the gain $c_0$ was described, but the gains $c_1$ and $c_2$ are also calculated by linear interpolation by two-dimensional matrices $c_1$_Table(g,f) and $c_2$_Table (g,f).

It is also possible to reverse the relation of the variables g and f so that the two-dimensional matrix is $c_0$_Table(f,g), and linear interpolation is performed by variables f, $f_1$, and f2.

In addition, it is possible to perform linear interpolation on the $c_0$_Table (g, f) by an equation representing a triangle shown in FIG. 9 showing a finite element method.

In the above-mentioned embodiments, gain matrices were used for computing gain, but if the speed change controller 61 comprises a high speed microcomputer, and the variables f and g represent the parameters shown in FIG. 3, the gain can be computed directly from equations (2)–(4) or equations (9)–(11).

When cam counterbalance feedback processing is used as in FIG. 2, the equations (2)–(4) are used.

When cam counterbalance feedback processing is not used, the equations (9)–(11) are used.

FIG. 10 shows a fourth embodiment of this invention.

Herein, the transfer function of the process until the target gyration angle is reflected by the real gyration angle is set as shown in the equation (14) instead of as in the equation (8).

The speed change controller 61 subtracts a value obtained by multiplying the real gyration angle $\phi$ by the direct proportional gain $c_1$ from the integral value, as shown in FIG. 10.

$$W(s) = \frac{g \cdot f \cdot c_0}{s^3 + (g \cdot b + g \cdot c_2) \cdot s^2 + g \cdot f \cdot c_1 \cdot s + g \cdot f \cdot c_0} \quad (14)$$

The contents of Tokugan Hei 9-312048, with a filing date of Nov. 13, 1997 in Japan, are hereby incorporated by reference. The corresponding structures, materials, acts, and equivalents of all step plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A controller for controlling a speed ratio of a continuously variable transmission for use with a vehicle, said transmission having an input shaft, output shaft, a valve for providing pressurized oil to change a speed ratio of rotations of said input shaft and output shaft, and an actuator for operating said valve, said controller comprising:

a sensor for detecting a rotation speed of said input shaft, a sensor for detecting a rotation speed of said output shaft, and a sensor for detecting a pressure of said pressurized oil, a sensor for detecting a temperature of said pressurized oil, and a microprocessor programmed to:
   calculate a target speed ratio of said continuously variable transmission according to a running state of the vehicle,
   calculate a real speed ratio of said continuously variable transmission based on the rotation speed of said input shaft and the rotation speed of said output shaft,
   determine a feedback gain based on said temperature, said pressure, said real speed ratio and the rotation speed of said output shaft,
   feedback control said actuator under said predetermined feedback gain such that said real speed ratio coincides with said target speed ratio based on a deviation between said real speed ratio and said target speed ratio.

2. A speed change controller as defined in claim 1, wherein said microprocessor is further programmed to calculate a first variable based on said pressure and said temperature, and a second variable based on said real speed ratio and a rotation speed of said output shaft, and to determine said feedback gain based on said first variable and said second variable.

3. A speed change controller as defined in claim 2, wherein said microprocessor is further programmed to determine a pair of candidates of said feedback gain by referring to a two-dimensional matrix having said first variable and second variable as elements, and to determine said feedback gain by applying a linear interpolation of said candidates.

4. A speed change controller as defined in claim 2, wherein said microprocessor is further programmed to perform proportional integral control of said actuator based on a deviation between said real speed ratio and target speed ratio by the following equation (A), and to calculate an integral gain and a proportional gain in said equation (A) as said feedback gain by the following equations (B) and (C):

$$W(s) = \frac{(c_1 \cdot s + c_0) \cdot g \cdot f}{s^3 + (g \cdot b + g \cdot c_2) \cdot s^2 + g \cdot f \cdot c_1 \cdot s + g \cdot f \cdot c_0} \quad (A)$$

$$c_0 = \frac{\lambda_1 \cdot \lambda_2 \cdot \lambda_3}{g \cdot f} \quad (B)$$

$$c_1 = \frac{(\lambda_1 \cdot \lambda_2 + \lambda_2 \cdot \lambda_3 + \lambda_3 \cdot \lambda_1)}{g \cdot f} \quad (C)$$

where, $c_0$=integral gain, $c_1$=proportional gain, $c_2$=differential gain, $\lambda_0$, $\lambda_1$, $\lambda_2$=positive real numbers, g=first variable, and f=second variable.

5. A speed change controller as defined in claim 2, wherein said continuously variable transmission comprises a mechanical feedback mechanism for feeding back a speed ratio to said valve, and said microprocessor is further programmed to perform proportional integral control of said actuator based on a deviation between said real speed ratio and target speed ratio by the following equation (D), and to calculate an integral gain and a proportional gain in said equation (D) as said feedback gain by the following equations (E) and (F):

$$W(s) = \frac{(c_1 \cdot s + c_0) \cdot g \cdot f}{s^3 + (g \cdot b + g \cdot c_2) \cdot s^2 + g \cdot f \cdot c_1 \cdot s + g \cdot f \cdot c_0} \quad (D)$$

$$c_0 = \frac{\lambda_1 \cdot \lambda_2 \cdot \lambda_3}{g \cdot f} \quad (E)$$

$$c_1 = \frac{(\lambda_1 \cdot \lambda_2 + \lambda_2 \cdot \lambda_3 + \lambda_3 \cdot \lambda_1)}{g \cdot f} - a \quad (F)$$

where, $c_0$=integral gain, $c_1$=proportional gain, $c_2$=differential gain, $\lambda_0$, $\lambda_1$, $\lambda_2$=positive real numbers, a=feedback gains of mechanical feedback mechanism, g=first variable, and f=second variable.

6. A continuously variable transmission for use with a vehicle comprising:

an input shaft, output shaft, a valve for providing pressurized oil, an actuator for operating said valve, a mechanism which varies a speed ratio of the rotations of said input shaft and said output shaft according to a pressure of said pressurized oil, a sensor for detecting a rotation speed of said input shaft, a sensor for detecting a rotation speed of said output shaft, a sensor for detecting said pressure of said pressurized oil, a sensor for detecting a temperature of said pressurized oil, and a microprocessor programmed to:
   calculate a target speed ratio of the rotations of said input shaft and said output shaft according to a running state of said vehicle, calculate a real speed ratio of the rotations of said input shaft and said output shaft based on the rotation speed of said input shaft and the rotation speed of said output shaft, determine a feedback gain based on said temperature, said pressure, said real speed ratio and the rotation speed of said output shaft, and feedback control said actuator under said predetermined feedback gain such that said real speed ratio coincides with said target speed ratio based on a deviation between said real speed ration and said target speed ratio.

7. A control method for controlling a speed ratio of a continuously variable transmission for use with a vehicle, said transmission comprising an input shaft, output shaft, a valve for providing pressurized oil, an actuator for operating said valve, and a mechanism which varies a speed ratio of the rotations of said input shaft and said output shaft according to a pressure of said pressurized oil, said method comprising the steps of:

calculating a target speed ratio of the rotations of said input shaft and said output shaft according to a running state of said vehicle, detecting a real speed ratio of said input shaft and said output shaft, calculating a feedback gain based on a temperature of said pressurized oil, said pressure, said real speed ratio and the rotation speed of said output shaft, and feedback controlling said actuator under said predetermined feedback gain such that said real speed ratio coincides with said target speed ratio based on a deviation between said real speed ratio and said target speed ratio.

* * * * *